US011133543B2

(12) United States Patent
Wu et al.

(10) Patent No.: US 11,133,543 B2
(45) Date of Patent: Sep. 28, 2021

(54) THERMAL MANAGEMENT DEVICE AND BATTERY PACK

(71) Applicant: CONTEMPORARY AMPEREX TECHNOLOGY CO., LIMITED, Ningde (CN)

(72) Inventors: Xingyuan Wu, Ningde (CN); Xingxing Li, Ningde (CN); Minjie Zheng, Ningde (CN); Haiqi Yang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 198 days.

(21) Appl. No.: 16/689,143

(22) Filed: Nov. 20, 2019

(65) Prior Publication Data

US 2020/0212526 A1    Jul. 2, 2020

(30) Foreign Application Priority Data

Dec. 28, 2018    (CN) .......................... 201822236759.6

(51) Int. Cl.
*H01M 10/00* (2006.01)
*H01M 10/6568* (2014.01)
*H01M 10/625* (2014.01)

(52) U.S. Cl.
CPC ..... *H01M 10/6568* (2015.04); *H01M 10/625* (2015.04); *H01M 2220/20* (2013.01)

(58) Field of Classification Search
CPC ......... H01M 10/6567; H01M 10/6568; H01M 10/656; H01M 10/6569; H01M 10/625; H01M 10/62; H01M 2220/20
See application file for complete search history.

(56) References Cited

U.S. PATENT DOCUMENTS 6,407,533 B1 *   6/2002   Bartek ............... H01M 10/627
                                                    320/150
10,427,491 B2 *  10/2019  Johnston ........... B60H 1/00385
(Continued)

FOREIGN PATENT DOCUMENTS

CN       103779629 A    5/2014
EP         3333932 A1    6/2018

OTHER PUBLICATIONS

European Search Report for European Application No. 19210621.9, dated Mar. 26, 2020, 7 pages.

*Primary Examiner* — Raymond Alejandro
(74) *Attorney, Agent, or Firm* — Tucker Ellis LLP

(57) ABSTRACT

A thermal management device and a battery pack are provided. The thermal management device applied in a battery pack. The battery pack includes a case and a plurality of cells received in the case. The thermal management device includes: a thermal management loop attached to each cell and at least partially covering a part of a vent of each cell; a heat exchange member communicating with the thermal management loop; and a power component connected between the thermal management loop and the heat exchange member. A heat exchange medium with a fire-extinguishing function is provided within the thermal management loop. The thermal management loop is broken in a condition where at least one cell is subjected to thermal runaway such that the heat exchange medium flows into an explosion-proof port of the at least one cell.

19 Claims, 4 Drawing Sheets

(56) References Cited

U.S. PATENT DOCUMENTS

| | | | | |
|---|---|---|---|---|
| 10,431,860 B2* | 10/2019 | Iqbal | ................... | H01M 10/613 |
| 10,522,845 B2* | 12/2019 | O'Donnell | ............. | B60H 1/323 |
| 2010/0136391 A1 | 6/2010 | Prilutsky et al. | | |

* cited by examiner

THERMAL MANAGEMENT DEVICE AND BATTERY PACK

CROSS-REFERENCE TO RELATED APPLICATIONS

The present application claims priority to Chinese Patent Application No. 201822236759.6, filed on Dec. 28, 2018, the content of which is incorporated herein by reference in its entirety.

TECHNICAL FIELD

The present disclosure relates to the technical field of battery technology, and in particular, relates to a thermal management device and a battery pack.

BACKGROUND

The emergence of a new energy vehicle greatly promotes the advance of the society and environment protection. Power batteries, as chargeable battery packs, are power sources of new energy vehicles and are widely deployed in the field of new energy vehicles. A thermal runaway propagation of a battery pack is an important evaluating indicator of safety of a battery system. A common method for restraining the thermal runaway propagation of the battery pack is to add a heat insulation material between cells, and the heat insulation material can retard the thermal runaway propagation from one cell to its adjacent cells.

Although the method in the related art can decrease a speed of the thermal runway propagation to a certain extent, it cannot completely prohibit the thermal runaway propagation, and merely postpones the thermal runway propagation due to limitations of weight energy density and space energy density. In this regards, there are still potential safety hazards.

SUMMARY

The present disclosure provides a thermal management device and a battery pack, for solving the technical problem in the related art the thermal runaway propagation from the cell subjected to the thermal runaway to its adjacent cells.

The present disclosure provides a thermal management device. The thermal management device is applied in a battery pack including a case and a plurality of cells received in the case. The thermal management device includes a thermal management loop attached to each of the plurality of cells and at least partially cover a part of a vent of each of the plurality of cells; a heat exchange member communicating with the thermal management loop; and a power component connected between the thermal management loop and the heat exchange member. A heat exchange medium with a fire-extinguishing function is provided within the thermal management loop. The thermal management loop is broken in a condition where at least one of the plurality of cells is subjected to a thermal runaway such that the heat exchange medium flows into an explosion-proof port of the at least one of the plurality of cells subjected to the thermal runaway.

In an embodiment, the thermal management loop includes a circulation pipe assembly and a liquid storage tank. The circulation pipe assembly is attached to each of the plurality of cells and at least partially covers a part of the vent of each of the plurality of cells, and the heat exchange medium is provided within the circulation pipe assembly. The liquid storage tank is configured to store the heat exchange medium. The liquid storage tank, the power component and the heat exchange member are communicated with each other.

In an embodiment, the circulation pipe assembly includes: a heat exchange assembly attached to each of the plurality of cells, the heart exchange assembly at least partially covering a part of the vent of each of the plurality of cells and provided with a liquid inlet port and a liquid outlet port; and a heat conductive connector through which the heat exchange assembly is connected to each of the plurality of cells.

In an embodiment, the heat exchange assembly includes a first guide tube provided with the liquid inlet port and the liquid outlet port; a second guide tube; and a plurality of heat exchange plates connected to each of the plurality of cells through the heat conductive connector and configured as a cavity structure for receiving the heat exchange medium. The plurality of heat exchange plates is communicated between the first guide tube and the second guide tube, and the plurality of heat exchange plates covers a part of the vent of each of the plurality of cells. The plurality of heat exchange plates is broken in the condition where the at least one of the plurality of cells is subjected to the thermal runaway such that the heat exchange medium flows into the explosion-proof port of the at least one of the plurality of cells subjected to the thermal runaway.

In an embodiment, the plurality of heat exchange plates is spaced apart from each other and connected in series; and the plurality of heat exchange plates is arranged between and communicated with the first guide tube and the second guide tube.

In an embodiment, a plurality of separating plates is provided within the cavity structure of the plurality of heat exchange plates and configured to separate the cavity structure into a plurality of flow channels.

In an embodiment, the plurality of heat exchange plates is made of an aluminum alloy material or a magnesium alloy material.

In an embodiment, the heat conductive connector is a heat conductive adhesive plate.

In an embodiment, a plurality of exhaust holes, the heat conductive adhesive plate is provided with a plurality of exhaust holes each corresponding to the vent of each of the plurality of cells.

The technical solutions according to the present disclosure bring the following beneficial effects.

The present disclosure provides the thermal management device applied in the battery pack. The plurality of cells is provided within the case of the battery pack. The thermal management device includes a thermal management loop attached to each cell, the heat exchange member communicating with the thermal management loop, and a power component connected between the thermal management loop and the heat exchange member. The thermal management loop at least partially covers the vent of each cell and the vent is located on the top of each cell. The heat exchange medium with a fire-extinguishing function is provided within the thermal management loop. The thermal management loop is broken when one of the plurality of cells is subjected to a thermal runaway such that the heat exchange medium flows into an explosion-proof port of the cell subjected to the thermal runaway. For example, during the operation of the battery pack, when a temperature of the cell of the battery pack is greater than a preset threshold value, the thermal management loop cools each cell efficiently with the heat exchange member and the power component;

similarly, when the temperature of the cell of the battery pack is lower than a preset threshold value, the thermal management loop heats each cell efficiently with the heat exchange member and the power component, in order to ensure the operation of cells 1 at the normal temperature and normal run of vehicles. The cell of the battery pack, which is subjected to the thermal runaway, can generate a huge amount of gas with high temperature and high pressure, which can break through the vent. In this way, the gas with high temperature and high pressure can damage pipes in the thermal management loop covering the vent, and thus the heat exchange medium in the thermal management loop that is damaged by the gas with high temperature, under the force of gravity, flows into the cell subjected to the thermal runaway through the explosion-proof port. Since the heat exchange medium in the thermal management loop has a fire-extinguishing function, the heat exchange medium flowing into the cell subjected to the thermal runaway can effectively prohibit a propagation of fire, thereby preventing adjacent cells from being affected. Such a configuration can perform a thermal management, i.e., efficiently cooling and heating the cell 1. When the thermal runaway occurs in the cell, the gas with high temperature generated by the cell subjected to the thermal runaway can break the thermal management loop, and thus the heat exchange medium with the fire-extinguishing function in the thermal management loop flows into the cell subjected to the thermal runaway, thereby extinguishing the fire and preventing the adjacent cells from being affected. The thermal management device has characters of thermal management and the thermal runaway propagation prohibition.

The present disclosure further provides a battery pack including the thermal management device described above.

The technical solutions according to the present disclosure bring the following beneficial effects.

The battery pack has same advantages as the thermal management device, which will not be repeated herein.

BRIEF DESCRIPTION OF DRAWINGS

In order to illustrate technical solutions of embodiments of the present disclosure or technical solutions in the related art, the accompanying drawings used in the embodiments of the present disclosure or the related art are simply introduced hereinafter. These drawings merely illustrate some embodiments of the present disclosure. On the basis of these drawings, those skilled in the art can also obtain other drawings without paying any creative effort.

Figure 1:
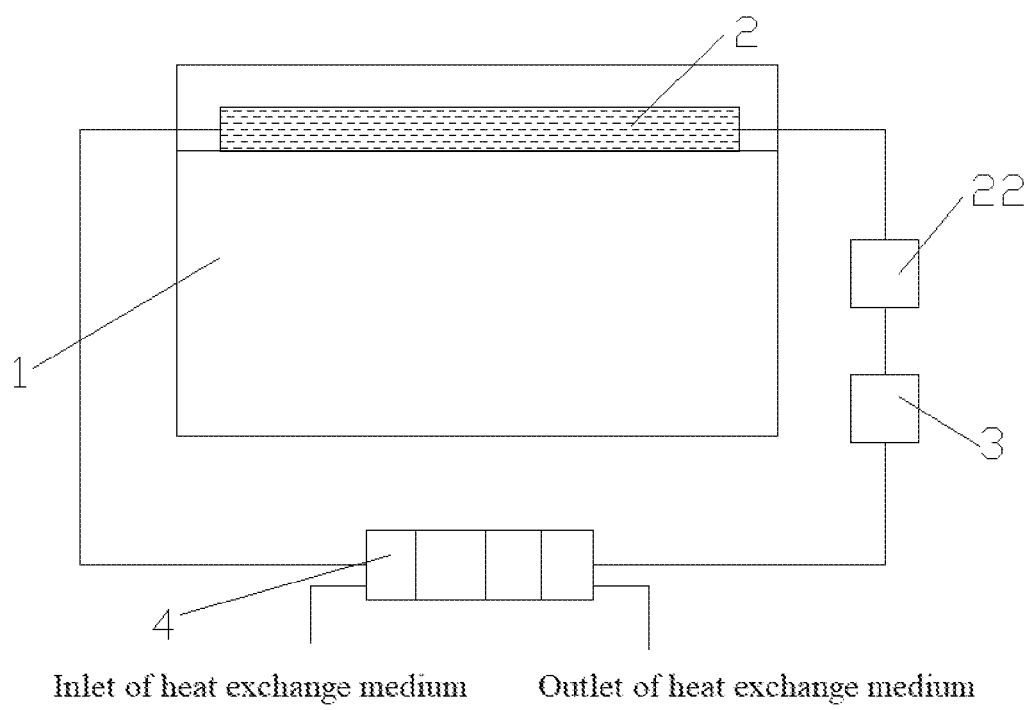
FIG. 1 is a structural schematic diagram of a thermal management device mounted on a battery pack according to an embodiment of the present disclosure.

REFERENCE SIGNS 1-cell;
2-thermal management loop;
21-circulation pipe assembly;
211-heat exchange assembly;
2111-first guide tube;
2111a-liquid inlet port;
2111b-liquid outlet port;
2112-second guide tube;
2113-heat exchange plate;
2113a-separating plate;
212-heat conductive connector;
2121-exhaust hole;
22-liquid storage tank;
3-power component; and
4-heat exchange member.

DESCRIPTION OF EMBODIMENTS

The technical solutions of the present disclosure will be described clearly and in detail in combination with the accompanying drawings. The following described embodiments are merely a part of the embodiments of the present disclosure rather than all of the embodiments. On the basis of the described embodiments, all other embodiments obtained by those skilled in the art without paying creative labor shall fall within the protection scope of the present disclosure.

It should be understood that the terms that are used in the context of the present disclosure to describe an orientation or position in view of orientations or positions illustrated in drawings, such as "in", "out" and the like, are merely used to explain the present disclosure, but not intended to indicate or hint that the described devices or elements must have a certain orientation, or are constructed and operated in a certain way. Thus, these terms shall not be interpreted as limitations to present disclosure.

It should be understood that the terms "mounted", "connected to" and "connected with" should be understood in a broad scope, unless other definitely stipulated and defined. For example, the term "connection" can be construed as a fixed connection, a detachable connection or an integrated connection; a mechanical connection or an electrical connection; a direct connection, or an indirect connection through a medium; or an internal connection of two elements. Those skilled in the art can understand the specific meanings of these terms in the present disclosure in combination with specific circumstances.

In an embodiment, a battery pack includes a battery case and a plurality of cells 1 arranged in the battery case. The plurality of cells 1 is stacked, and each cell 1 includes a top cover, a positive electrode and a negative electrode. On the top cover are disposed a positive electrode terminal, a negative electrode terminal and a vent disposed between the positive electrode terminal and the negative electrode terminal. The positive electrode terminal and the negative electrode terminal are not differentiated from each other in the drawings. The positive electrode terminal and the negative electrode terminal are electrically connected to the positive electrode and the negative electrode (not shown) of the cell 1 through conductive connectors, respectively. The battery case has a shape of cube, which defines a space (or a cavity) for receiving each cell 1. When a short circuit, overcharging and the like occur in the battery pack, the heat generated by the cell 1 greatly exceeds a normal value, resulting in a thermal runaway.

In embodiments shown in FIG. 1, FIG. 3, FIG. 5 and FIG. 6, the thermal management device includes a thermal management loop 2 attached to each cell 1, a heat exchange member 4 communicated with the thermal management loop 2, and a power component 3 connected between the thermal management loop 2 and the heat exchange member 4. The thermal management loop 2 at least partially covers a vent on the top of each cell 1. A heat exchange medium having a fire-extinguishing function is provided within the thermal management loop 2. The thermal management loop 2 can be damaged when the thermal runaway occurs in any one of cells 1, such that the heat exchange medium flows into an explosion-proof port of the cell 1. During the operation of the battery pack, when a temperature of the cell 1 of the battery pack is greater than a preset threshold value, the thermal management loop 2 cools each cell 1 efficiently with the heat exchange member 4 and the power component 3. Similarly, when the temperature of the cell 1 of the battery pack is lower than a preset threshold value, the thermal management loop 2 heats each cell 1 efficiently with the heat exchange member 4 and the power component 3, in order to ensure the operation of cells 1 at the normal temperature and normal run of vehicles. The cell 1 of the battery pack, which is subjected to the thermal runaway, can generate a huge amount of gas with high temperature and high pressure, which can break through the vent. In this way, the gas with high temperature and high pressure can damage pipes in the thermal management loop 2 covering the vent, and thus the heat exchange medium in the thermal management loop 2 that is damaged by the gas with high temperature, under the force of gravity, flows into the cell 1 subjected to the thermal runaway through the explosion-proof port. Since the heat exchange medium in the thermal management loop 2 has a fire-extinguishing function, the heat exchange medium flowing into the cell 1 subjected to the thermal runaway can effectively prohibit a propagation of fire, thereby preventing adjacent cells 1 from being affected. Such a configuration can perform a thermal management, i.e., efficiently cooling and heating the cell 1. When the thermal runaway occurs in the cell 1, the gas with high temperature generated by the cell 1 subjected to the thermal runaway can break the thermal management loop 2, and thus the heat exchange medium with the fire-extinguishing function in the thermal management loop 2 flows into the cell 1 subjected to the thermal runaway, thereby extinguishing the fire and preventing the adjacent cells 1 from being affected. The thermal management device has characters of thermal management and the thermal runaway propagation prohibition.

The heat exchange medium is selected from materials having anti-flaming, cooling properties and the like, and simultaneously being able to exchange heat with the cell 1, such as halogenated hydrocarbon, phosphate, or hydrofluoroether. In the present embodiment, in order to extinguish fire quickly and improve security, the heat exchange medium is a fluorinated liquid, which has a boiling point in a range of 60° C. to 120° C. When the fluorinated liquid flows into the cell 1 through the explosion-proof port, the cell 1 can be cooled by transferring the heat to boil the fluorinated liquid, thereby diminishing the influence on adjacent cells 1. At the same time, the fluorinated liquid is boiled to generate a huge amount of gas during a phase transition, which can further decrease a temperature of exhaust gas of the cell 1, thereby increasing the security of the battery pack. In addition, the gas generated by the fluorinated liquid during the phase transition also can isolate the air, which further improves the prohibitive effect on the thermal runaway propagation when the cell 1 is subjected to the thermal runaway.

In the present embodiment, the heat exchange member 4 is a heat exchanger, and the power component 3 is a circulation water pump. The heat exchange member 4 and the thermal management loop 2 can be connected to each other in any connection manner known in the related art, which is not specifically limited herein, as long as the heat exchange and circulation of the heat exchange medium are guaranteed.

In the present embodiment, in order to automate the heat exchange member 4, the heat exchange member 4 is electrically connected to both a temperature sensor and a controller. The temperature sensor is configured to detect a change of temperature of the cell 1 in the battery pack and communicate with the controller. When the temperature of the cell 1 is higher than a preset temperature, a signal is transmitted to and received by the controller, and the controller controls the heat exchanger to perform a cooling process so as to cool the cell 1. When the temperature of the cell 1 is lower than a preset temperature, a signal is transmitted to and received by the controller, and the controller controls the heat exchanger to perform a heating process for heating the cell 1 with the heat exchange medium. A connection between the heat exchange member 4 and the temperature sensor as well as a connection between the heat exchange member 4 and the controller are known in the related art and are not specifically limited herein.

As shown in FIG. 1, a circulation pipe assembly 21 can directly store the heat exchange medium, in order to achieve a better heat exchange effect and ensure a sufficient amount of the heat exchange medium flowing into the cell 1 that is subjected to the thermal runaway at the same time. In the present embodiment, the thermal management loop 2 includes the circulation pipe assembly 21 attached to each cell 1 and a liquid storage tank 22 configured to store the heat exchange medium. The circulation pipe assembly 21 at least partially covers a part of the vent of each cell 1. The heat exchange medium is provided within the circulation pipe assembly 21. In addition, the liquid storage tank 22, the power component 3 and the heat exchange member 4 are in communication with each other.

Figure 2:
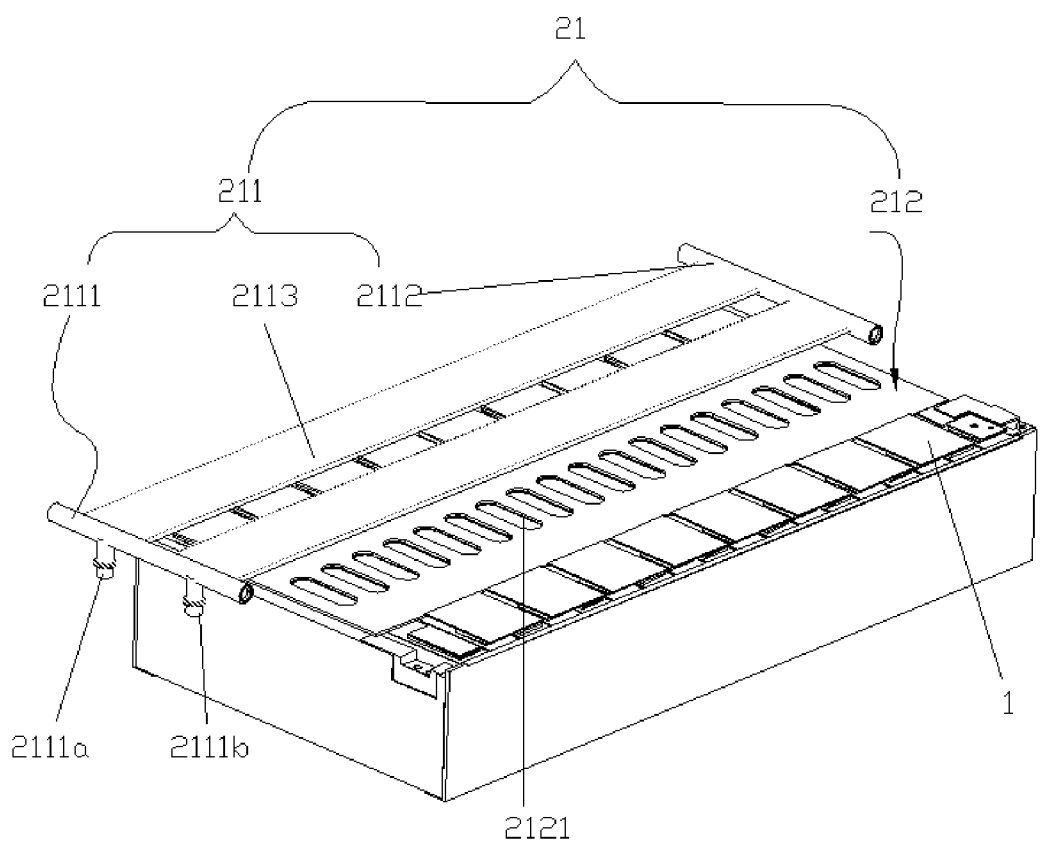
FIG. 2 is an explosive view of a heat exchange assembly and the battery pack in FIG. 1.
Figure 3:
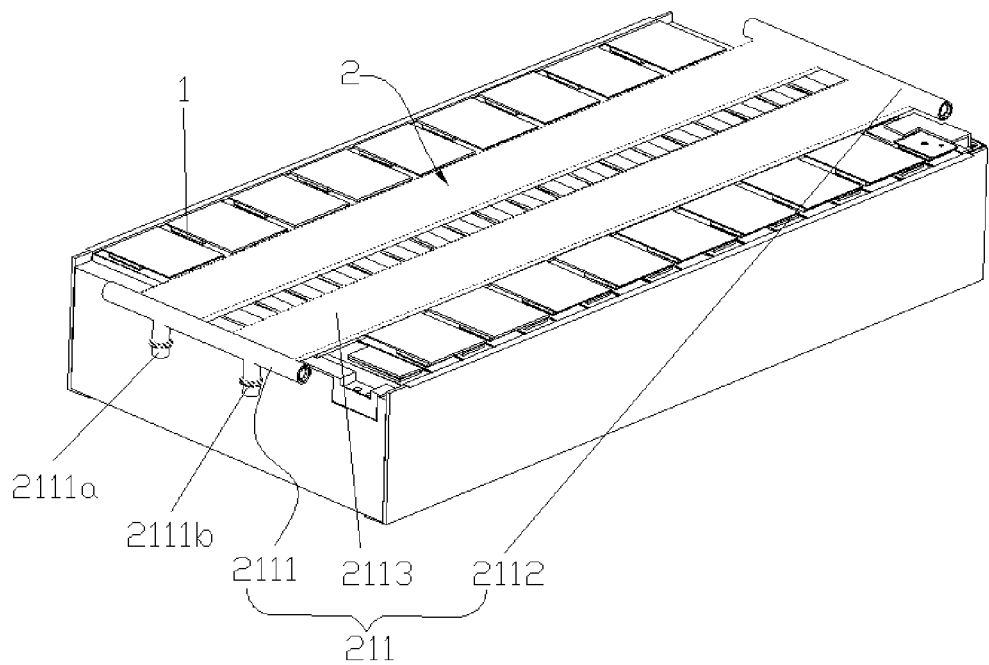
FIG. 3 is a structural schematic diagram of a heat exchange assembly mounted on the battery pack in FIG. 1.
Figure 5:
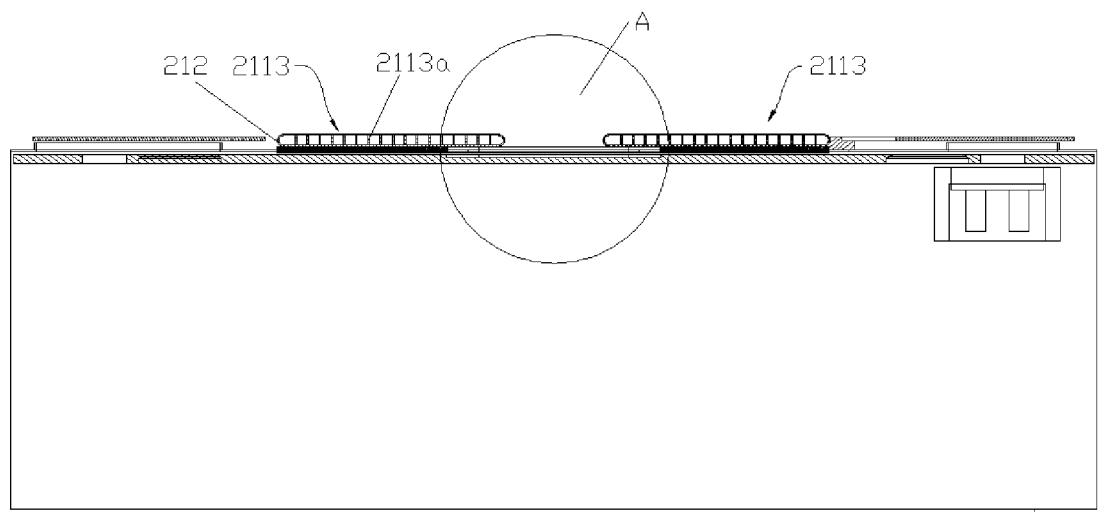
FIG. 5 is a perspective view of a heat exchange assembly mounted on a battery pack according to an embodiment of the present disclosure.

As shown in FIG. 2, FIG. 3 and FIG. 5, the circulation pipe assembly 21 includes a heat conductive connector 212 and a heat exchange assembly 211 attached to each cell 1. The heat exchange assembly 211 is connected to each cell 1 through the heat conductive connector 212 and completely covers the entire vent. In the present embodiment, in order to guarantee an smooth and unhampered exhaust of gas through the vent and enhance the security of the battery pack, the heat exchange assembly 211 covers a part of the vent of each cell 1 and is provided with a liquid inlet port 2111a and a liquid outlet port 2111b. The heat exchange assembly 211 is attached to the cell 1, e.g., being fixed to the cell 1 through a bolt or being clamped to the cell 1. In order to connect the heat exchange assembly 211 and the cell 1 together conveniently and steadily, in an embodiment, the heat exchange assembly 211 is connected to each cell 1 through the heat conductive connector 212 and performs the thermal management to each cell 1 through heat conductive connector 211.

In the present embodiment above, the liquid storage tank 22, the power component 3 and the heat exchange assembly 4 are communicated with each other in any manner known in the related art, which is not specifically limited herein, as long as a normal circulation of the heat exchange medium in the circulation assembly 21 can be guaranteed.

As shown in FIG. 2 to FIG. 5, a heat exchange body of the heat exchange assembly 211 has a shape of pipe. In the present embodiment, in order to enlarge a heat exchange area, the heat exchange assembly 211 includes a plurality of heat exchange plates 2113 that enlarges a contacting area between the heat exchange medium and the cell 1, thereby increasing a heat exchange efficiency. The plurality of heat exchange plates 2113 is connected to each cell 1 through the heat conductive connector 212.

The heat exchange plate 2113 is made of a material having a lower melting point such that the heat exchange plate 2113 can be broken by the high temperature gas released by the cell 1 within the shortest time when the cell 1 is subjected to the thermal runaway. In an embodiment, the heat exchange plate 2113 can be made of an aluminum alloy material or a magnesium alloy material. In the present embodiment, the heat exchange plate 2113 is made of an aluminum alloy material to reduce the cost.

As shown in FIG. 2, the heat conductive connector 212 can be a heat conductive adhesive, and the heat exchange assembly 211 is adhered to a surface of the cell 1 through the heat conductive adhesive. In the present embodiment, in order to increase the heat conductive area and facilitate the adhering of the heat exchange assembly 211 to the cell 1 simultaneously, the heat conductive connector 212 can be a heat exchange adhesive plate. The heat exchange adhesive plate can directly be adhered between the heat exchange plates 2113 and the cell 1. In order to prevent the heat conductive adhesive plate from sealing and covering the vent and blocking the exhaust of gas through the vent, exhaust holes 2121 corresponding to vents of the cell 1 are provided in the heat conductive adhesive plate, and a size of the exhaust hole 2121 is not smaller than a size of the vent. In an embodiment, the size of the exhaust hole 2121 is the same as that of the vent.

Figure 4:
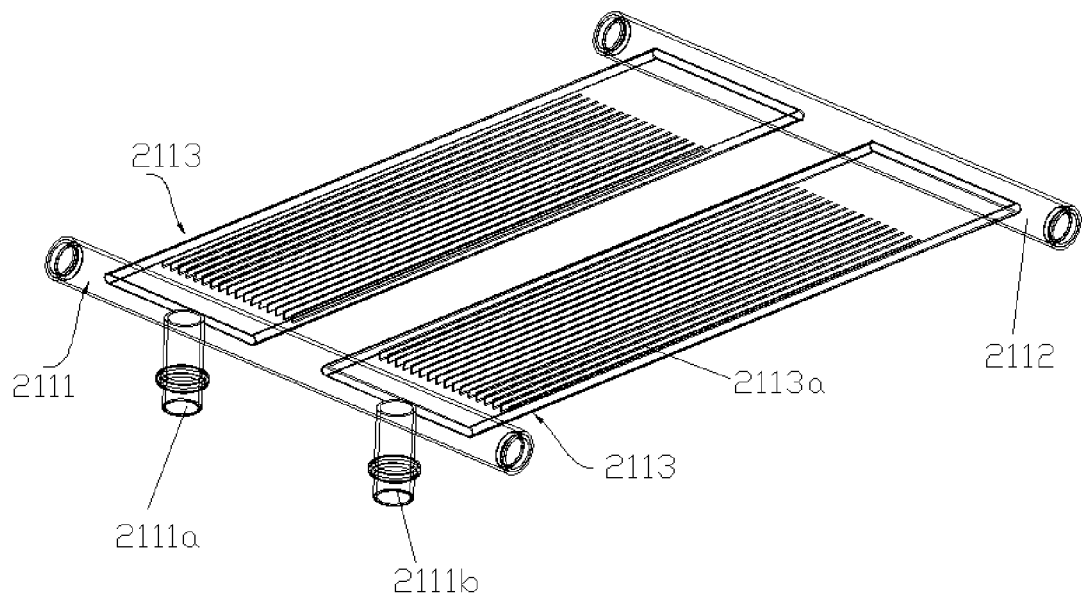
FIG. 4 is a perspective view of a heat exchange assembly in FIG. 1.

As shown in FIG. 2 to FIG. 4, in order to perform a thermal management of the plurality of heat exchange plates 2113, the heat exchange assembly 211 further includes a first guide tube 2111 and a second guide tube 2112. The first guide tube 2111 is provided with a first liquid inlet port 2111a and a liquid outlet port 2111b, the plurality of heat exchange plate 2113 is communicated with the liquid storage tank 22 through the first guide tube 2111 and the second guide tube 2112. The plurality of heat exchange plate 2113 is connected to each other in parallel and connected between the first guide tube 2111 and the second guide tube 2112. In the present embodiment, in order to decrease the amount of the heat exchange medium in both the heat exchange plate 2113 and the liquid storage tank 22 and simplify the communication between the heat exchange plates 2113, the plurality of heat exchange plate 2113 is spaced apart from each other and connected in series between the first guide tube 2111 and the second guide tube 2112, and each heat exchange plate 2113 covers a part of the vent of each cell 1.

An angle can be enclosed between a direction in which the heat exchange plate 2113 extends and a direction in which the cells 1 are stacked. In the embodiment shown in FIG. 2, in order to assembly the heat exchange plate 2113 conveniently, the heat exchange plate 2113 extends in the direction in which the cells 1 are stacked. A number of the heat exchange plates 2113 can be greater than one, e.g., two, three, four, five and so on. For example, two heat exchange plates 2113 are provided to guarantee the thermal management of the battery pack and reduce the cost at the same time. In an embodiment, the vent of the cell 1 is arranged in the middle of the top cover, and the two heat exchange plates 2113 are oppositely disposed at two sides of a center line of the vent and respectively cover two ends of the vent, such that the heat exchange medium in the two heat exchange plates 2113 can flow into the cell 1 that is subjected to the thermal runaway, thereby improving the security.

Figure 6:
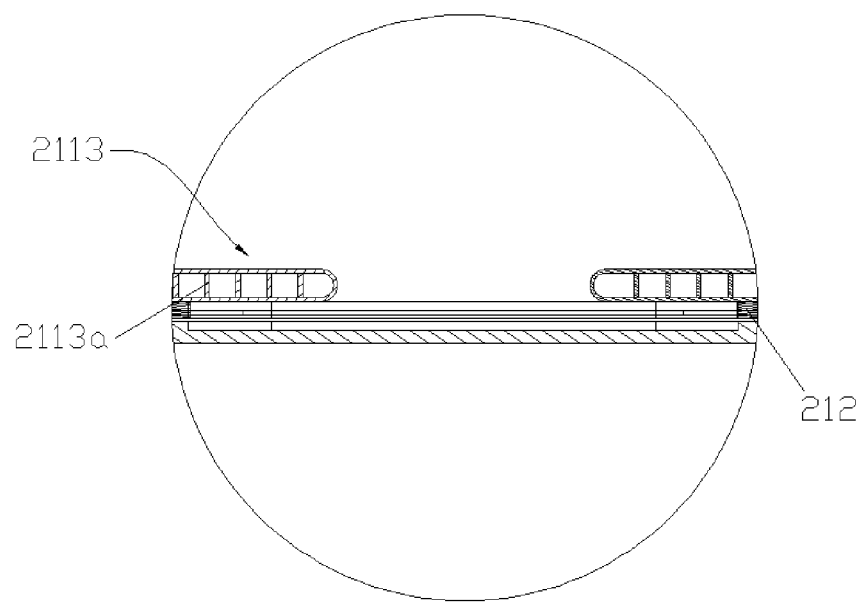
FIG. 6 is an enlarged view of an area A in FIG. 5.

As shown in FIG. 4 to FIG. 6, a cavity structure provided within the heat exchange plate 2113 can be as an integral portion, i.e., the heat exchange plate 2113 has only one flow channel. In the present embodiment, in order to improve the heat exchange effect of the heat thermal management device, a plurality of separating plates 2113a is provided within the cavity structure of the heat exchange plate 2113 to space the cavity structure of the heat exchange plate 2113 into a plurality of flow channels, and the plurality of separating plates 2113a is uniformly-spaced along a direction perpendicular to the direction in which the cells 1 are stacked.

The present disclosure further provides a battery pack including the thermal management device according to any one of the above embodiments.

The battery pack provided in embodiments of the present disclosure has same advantages as the above thermal management device, which will not be repeated herein.

It should be understood that the embodiments discussed above are merely used to illustrate, but not intended to limit the technical solutions of the present disclosure. Although the present disclosure is described in detail with reference to the embodiments, those skilled in the art still can modify the technical solutions in the above embodiments in various manners, or equivalently replace a part of or all of technical features. Such modifications or equivalent replacement without departing from the principles of the present disclosure should be included in the scope of protection of the present disclosure.

What is claimed is:

1. A thermal management device applied in a battery pack, the battery pack comprising a case and a plurality of cells (1) received in the case, the thermal management device comprising:
    a thermal management loop (2) attached to each of the plurality of cells (1) and at least partially covering a part of a vent of each of the plurality of cells (1);
    a heat exchange member (4) communicating with the thermal management loop (2); and
    a power component (3) connected between the thermal management loop (2) and the heat exchange member (4),
    wherein a heat exchange medium with a fire-extinguishing function is provided within the thermal management loop (2), and the thermal management loop (2) is broken in a condition where at least one of the plurality of cells (1) is subjected to a thermal runaway such that the heat exchange medium flows into an explosion-proof port of the at least one of the plurality of cells (1) subjected to the thermal runaway.

2. The thermal management device according to claim 1, wherein the thermal management loop (2) comprises:
    a circulation pipe assembly (21) attached to each of the plurality of cells (1) and at least partially covering a part of the vent of each of the plurality of cells (1), wherein the heat exchange medium is provided within the circulation pipe assembly (21); and
    a liquid storage tank (22) configured to store the heat exchange medium;
    wherein the liquid storage tank (22), the power component (3) and the heat exchange member (4) are communicated with each other.

3. The thermal management device according to claim 2, wherein the circulation pipe assembly (21) comprises:
    a heat exchange assembly (211) attached to each of the plurality of cells (1), the heat exchange assembly (211) at least partially covering a part of the vent of each of the plurality of cells (1) and being provided with a liquid inlet port (2111a) and a liquid outlet port (2111b); and a heat conductive connector (212) through which the heat exchange assembly (211) is connected to each of the plurality of cells (1).

4. The thermal management device according to claim 3, wherein the heat exchange assembly (211) comprises:
a first guide tube (2111) provided with the liquid inlet port (2111a) and the liquid outlet port (2111b);
a second guide tube (2112); and
a plurality of heat exchange plates (2113) connected to each of the plurality of cells (1) through the heat conductive connector (212) and configured as a cavity structure for receiving the heat exchange medium;
wherein the plurality of heat exchange plates (2113) is communicated between the first guide tube (2111) and the second guide tube (2112), and the plurality of heat exchange plates (2113) covers a part of the vent of each of the plurality of cells (1); and the plurality of heat exchange plates (2113) is broken in the condition where the at least one of the plurality of cells (1) is subjected to the thermal runaway such that the heat exchange medium flows into the explosion-proof port of the at least one of the plurality of cells (1) subjected to the thermal runaway.

5. The thermal management device according to claim 4, wherein the plurality of heat exchange plates (2113) is spaced apart from each other and connected in series, and the plurality of heat exchange plates (2113) is arranged between and communicated with the first guide tube (2111) and the second guide tube (2112).

6. The thermal management device according to claim 4, wherein a plurality of separating plates (2113a) is provided within the cavity structure of the plurality of heat exchange plates (2113) and configured to separate the cavity structure into a plurality of flow channels.

7. The thermal management device according to claim 4, wherein the plurality of heat exchange plates (2113) is made of an aluminum alloy material or a magnesium alloy material.

8. The thermal management device according to claim 3, wherein the heat conductive connector (212) is a heat conductive adhesive plate.

9. The thermal management device according to claim 8, wherein the heat conductive adhesive plate is provided with a plurality of exhaust holes (2121) each corresponding to the vent of each of the plurality of cells (1).

10. A battery pack, comprising the thermal management device according to claim 1.

11. The battery pack according to claim 10, wherein the thermal management loop (2) comprises:
a circulation pipe assembly (21) attached to each of the plurality of cells (1) and at least partially covering a part of the vent of each of the plurality of cells (1), wherein the heat exchange medium is provided within the circulation pipe assembly (21); and
a liquid storage tank (22) configured to store the heat exchange medium;
wherein the liquid storage tank (22), the power component (3) and the heat exchange member (4) are communicated with each other.

12. The battery pack according to claim 11, wherein the circulation pipe assembly (21) comprises:
a heat exchange assembly (211) attached to each of the plurality of cells (1), the heat exchange assembly (211) at least partially covering a part of the vent of each of the plurality of cells (1) and being provided with a liquid inlet port (2111a) and a liquid outlet port (2111b); and
a heat conductive connector (212) through which the heat exchange assembly (211) is connected to each of the plurality of cells (1).

13. The battery pack according to claim 12, wherein the heat exchange assembly (211) comprises:
a first guide tube (2111) provided with the liquid inlet port (2111a) and the liquid outlet port (2111b);
a second guide tube (2112); and
a plurality of heat exchange plates (2113) connected to each of the plurality of cells (1) through the heat conductive connector (212) and configured as a cavity structure for receiving the heat exchange medium;
wherein the plurality of heat exchange plates (2113) is communicated between the first guide tube (2111) and the second guide tube (2112), and the plurality of heat exchange plates (2113) covers a part of the vent of each of the plurality of cells (1); and the plurality of heat exchange plates (2113) is broken in the condition where the at least one of the plurality of cells (1) is subjected to the thermal runaway such that the heat exchange medium flows into the explosion-proof port of the at least one of the plurality of cells (1) subjected to the thermal runaway.

14. The battery pack according to claim 13, wherein the plurality of heat exchange plates (2113) is spaced apart from each other and connected in series, and the plurality of heat exchange plates (2113) is arranged between and communicated with the first guide tube (2111) and the second guide tube (2112).

15. The battery pack according to claim 13, wherein a plurality of separating plates (2113a) is provided within the cavity structure of the plurality of heat exchange plates (2113) and configured to separate the cavity structure into a plurality of flow channels.

16. The battery pack according to claim 13, wherein the plurality of heat exchange plates (2113) is made of an aluminum alloy material or a magnesium alloy material.

17. The battery pack according to claim 12, wherein the heat conductive connector (212) is a heat conductive adhesive plate.

18. The battery pack according to claim 17, wherein the heat conductive adhesive plate is provided with a plurality of exhaust holes (2121) each corresponding to the vent of each of the plurality of cells (1).

19. A vehicle, comprising the battery pack according to claim 10.

* * * * *